July 28, 1953 R. K. DUNCAN 2,647,162

ELECTROACOUSTICAL SIGNAL TRANSDUCER

Filed Jan. 16, 1951

INVENTOR
Robert K. Duncan
BY H. K. Newton
ATTORNEY

Patented July 28, 1953

2,647,162

UNITED STATES PATENT OFFICE 2,647,162

ELECTROACOUSTICAL SIGNAL TRANSDUCER

Robert K. Duncan, Woodburn, Ind., assignor to Radio Corporation of America, a corporation of Delaware Application January 16, 1951, Serial No. 206,277

10 Claims. (Cl. 179—1)

Figure 1:
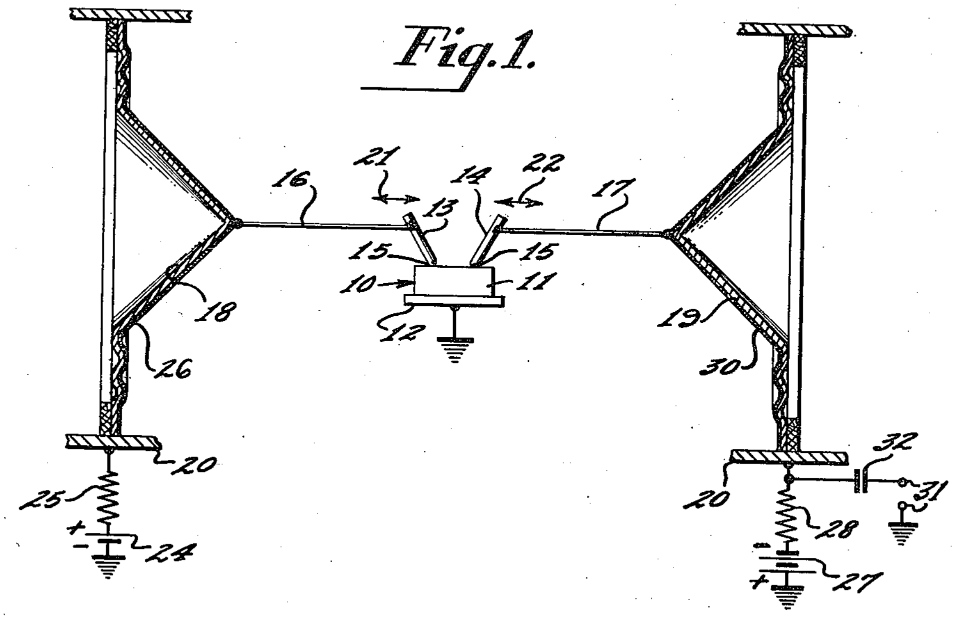

This invention relates generally to electromechanical signal transducers, and particularly, although not exclusively, relates to a second-order pressure-gradient microphone of the semi-conductor type.

Second-order pressure-gradient microphones are well known in the art as evidenced by the Patent 2,301,744 to H. F. Olson. It is well known that such microphones exhibit a certain directivity, and accordingly they are frequently employed when it is desired to reduce the effects of ambient noise. A conventional second-order pressure-gradient microphone consists of two first order pressure gradient microphones, such as two velocity microphones which are disposed in predetermined spaced relationship to receive the same mechanical pressure wave with a different predetermined phase relationship as is well known. It is conventional practice to derive an electrical output signal from each of the individual first order pressure-gradient microphones. The two electrical signals are then combined electrically in opposed phase relation to obtain a combined electrical signal representative of the vector difference of the motion of the two first-order pressure-gradient microphones.

Various microphones have been proposed which make use of a semi-conductor amplifier or transistor. Thus the Patent 2,497,770 to Hanson discloses a transistor microphone wherein the motions of the microphone vary the pressure between the semi-conducting body of the transistor and its emitter and collector electrodes. These pressure variations are utilized to control the gain of the transistor in accordance with the motion of the microphone diaphragm. Another transistor microphone has been described in Patent 2,522,521 to Kock. This microphone makes use of the variation of the gain of the transistor as a function of its temperature. A heat source such as a heated loop of twisted wire approaches or recedes from the semi-conducting body of the transistor in accordance with the movements of a diaphragm. However, these prior art transistor microphones are not adapted to be used to obtain an output signal which is directly representative of the vector difference of the motion of two microphones. In other words they cannot readily be made to function as second order pressure gradient microphones.

An electromechanical transducer embodying the present invention may also be used to modify or modulate an electrical output signal derived in response to vibrations of a vibratile device such as a microphone diaphragm or the stylus of a phonograph pickup device.

It is accordingly an object of the present invention to provide a second-order pressure-gradient microphone including a semi-conductor device of the transistor type which will develop directly an electrical output signal representative of the vector difference of the motion of two first order pressure gradient microphones.

A further object of the invention is to provide an electromechanical transducer including a transistor wherein the electrical signal derived from a microphone or a phonograph pickup device can be directly modulated or modified.

Another object of the invention is to provide an improved second order pressure gradient microphone of the semi-conductor type which will develop a high electrical output signal.

An electromechanical transducer in accordance with the present invention comprises a semi-conductor device such as a transistor. The transistor includes a semi-conducting body having a base electrode in fixed, low-resistance contact therewith. An emitter and a collector electrode are in rectifying contact with the semi-conducting body or crystal and consists each of a conductor, such as a fine wire, having a rounded tip in contact with the crystal. A vibratile device such as a diaphragm is connected with one of the conductors so as to tilt it while in contact with the crystal, thereby to roll the tip in response to vibrations of the vibratile device. The other conductor may also, and in similar manner, be connected with a second vibratile device such as a diaphragm. Alternatively, means such as a relay or solenoid may be connected to the second conductor to roll the tip in contact with the body in response to a signal impressed on the relay.

Accordingly, in the first case the distance between the contact points of the conductors with the crystal is determined by the vector difference of the motion of the two diaphragms. It is well known that the gain of the transistor is normally a function of the distance between the contact points of emitter and collector electrodes. Therefore, an electrical output signal may be derived from the transducer of the invention which is representative of the vector difference of the motion of the diaphragms.

If the second one of the conductors is moved or rolled over the crystal by a solenoid the electrical output signal is representative of the vibrations of the diaphragm and of the signal impressed on the solenoid. In this manner the electrical output signal may be modified or modulated in any desired manner.

Figure 2:
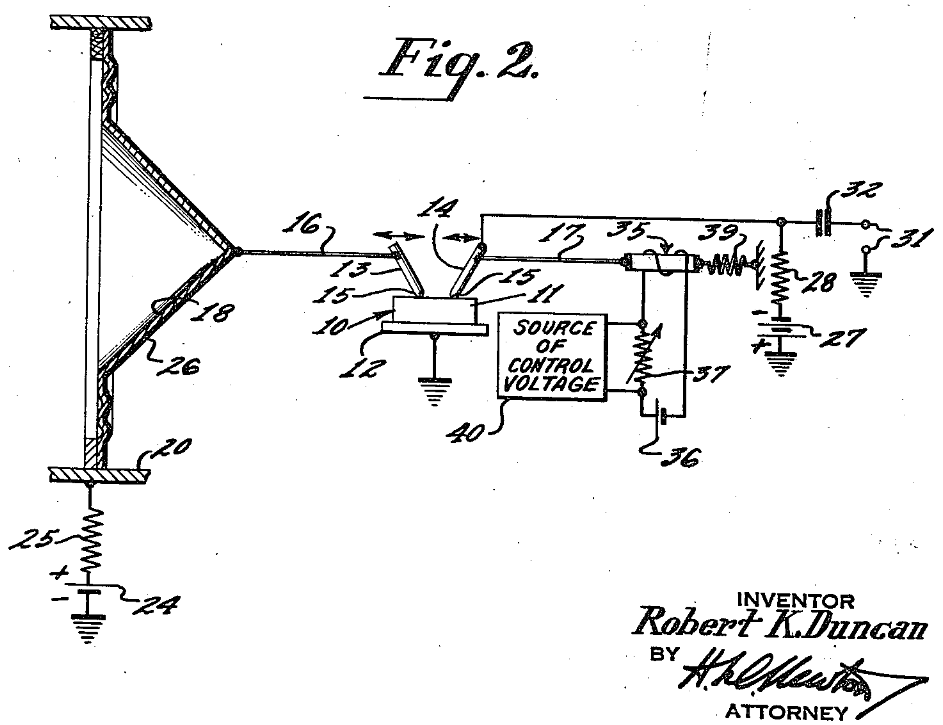

The novel features that are considered characteristic of this invention are set forth with particularity in the appended claims. The invention itself, however, both as to its organization and method of operation as well as additional objects and advantages thereof, will best be understood from the following description when read in connection with the accompanying drawing, in which:

Figure 1 is a schematic representation of a second-order pressure-gradient microphone embodying the present invention; and Figure 2 is a schematic representation of an electromechanical transducer, being a further embodiment of the invention, for deriving an output signal, representative of the vibrations of a diaphragm, modulated in accordance with a control signal.

Referring now to the drawing in which like components have been designated by the same reference numerals throughout the figures, and particularly to Figure 1, there is illustrated a second-order pressure-gradient microphone including a semi-conductor device 10. The device 10 comprises body 11 of semi-conducting material which may consist, for example, of silicon or preferably of germanium. The germanium may be prepared so as to be an N type semi-conductor as is well known and its surface may be polished and etched in accordance with conventional practice.

A base electrode 12 is in fixed, low-resistance contact with body 11. Base electrode 12 may, for example, consist of a suitable metallic plate which is soldered or sweated to body 11 to provide a low resistance contact. The contact area of base electrode 12 with body 11 is immaterial as long as base electrode 12 is in low-resistance contact with the crystal. Emitter electrode 13 and collector electrode 14 are in rectifying contact with body or crystal 11. The emitter 13 and collector 14 may be identical and may consist of a fine wire of tungsten or phosphor bronze having a rounded tip as clearly shown at 15, 15. As illustrated in the drawing, the emitter 13 and collector 14 form point contacts, but it is to be understood that they may also consist of line contacts provided they are in rectifying contact with the crystal.

Emitter 13 and collector 14 are usually spaced a few mils apart. It is also well known that normally the gain of the transistor is a function of the distance between the contact points or areas of the emitter and of the collector with the semi-conducing crystal. Accordingly, if this distance is varied or modulated, an electrical output signal is obtained which is representative of the variation or modulation of the distance between the contact points of the emitter and collector electrodes with the crystal. The present invention makes use of this characteristic of a semi-conductor device or transistor to obtain a second order pressure gradient microphone or an electromechanical transducer.

Accordingly in accordance with the invention emitter 13 and collector 14 are each mechanically connected through rods 16 and 17 with diaphragms 18 and 19 respectively. Diaphragms 18, 19 are first order pressure gradient microphones such as velocity microphones well known in the art. The diaphragms 18 and 19 are clamped or fixed at their rims to suitable supports indicated at 20, 20 which preferably consists of a conducting material such as metal.

As indicated by arrows 21, 22, the emitter 13 and the collector 14 are arranged to be tilted by movement of their respective diaphragms 18 and 19, so that their tips 15, 15 roll in contact with the body 11 in response to vibration or movement of the diaphragms 18, 19. It will readily be seen that if diaphragms 18, 19 move in unison, the distance between the contact points of the electrodes 13 and 14 with body 11 remains constant. However, if the two diaphragms 18, 19 move simultaneously in opposite directions, the distance between the tips 15, 15 of electrodes 13, 14 and the body 11 will vary. Accordingly, the distance between the contact points 15, 15 on body 11 is representative of the vector difference of the motion of the two diaphragms 18, 19.

The diaphragms 18 and 19, which are first order pressure gradient devices, are disposed in predetermined spaced relationship to receive the same mechanical pressure wave with a different predetermined phase relationship as is well known.

Since the gain of semi-conductor device 10 depends on the distance between the contact points 15, 15 with the body 11, an electrical output signal can be developed from the transducer of Figure 1 which is a function of this distance. To this end, operating potentials are applied to the electrodes 12, 13, 14. A voltage in the forward direction is impressed between emitter 13 and base 12 and a voltage in the reverse direction is impressed between collector 14 and base 12. If crystal 11 is of the N type, emitter 13 should be positive and collector 14 negative with respect to the base. If crystal 11 should be of the P type, the polarities of the voltages must be reversed.

Accordingly, base electrode 12 may be grounded as shown. A suitable source of voltage such as battery 24 may have its negative terminal grounded, while its positive terminal is connected through resistor 25 to emitter electrode 13. This connection may be made through support 20, through a conducting film 26 on diaphragm 18 and connecting rod 16. Metallic film 26 may be sprayed or otherwise applied to diaphragm 19.

For the purpose of applying a voltage in the reverse direction between collector 14 and base 12 there may be provided a suitable source of voltage such as battery 27 having its positive terminal grounded. The negative terminal of battery 27 may be connected to collector 14 through resistor 28. This connection may be effected through support 20, a conducting film 30 on diaphragm 19 and connecting rod 17. It is to be understood that battery 24 may be replaced by a conventional bias network consisting of a capacitor shunted by a resistor which will develop the required bias voltage between emitter 13 and base 12.

An output signal may be developed across load resistor 28 and may be obtained from output terminals 31, one of which is grounded while the other one is coupled to the junction point between resistor 28 and support 20 through coupling capacitor 32. It will be understood that the electrical output signal obtained from output terminals 31 is representative of the vector difference of the motion of diaphragms 18, 19. Thus an electrical output signal of comparatively high amplitude is obtained directly which corresponds to the derivative of the first order pressure gradient.

Figure 2 illustrates an electromechanical transducer including a semi-conductor device 10 which may be identical to that shown in Figure 1. Emitter electrode 13 is again connected by rod 16 with diaphragm 19 which may be responsive to the first order pressure gradient or even to the zero order pressure gradient; such a microphone is commonly called a pressure microphone. Instead of connecting collector 14 with another diaphragm, its motion is controlled by a solenoid 35 which operates as a variable position device.

Solenoid 35 is energized by battery 36 connected in series with resistor 37. The movable core of solenoid 35, in turn, is connected to connecting rod 17 which controls the motion of collector 14. The movable core of solenoid 35 moves against the action of a mechanical spring 39 secured to a fixed support as shown. By varying the resistance of resistor 37 or by impressing a control voltage, which may be developed by source 40, across resistor 37, the magnetic field developed by the solenoid may be modulated or modified. This in turn will, by the rolling action, modify or "modulate" the position of the contact point of collector 14 on crystal 11.

Consequently, the output signal derived from the device of Figure 2 is a function of both the motion of diaphragm 18 and the core of solenoid 35. The electrical output signal may thus be modified or modulated, for example, to obtain volume compression or expansion of the acoustical signal.

It is obvious that the position of the emitter electrode 13 may also, in the same manner, be controlled by the stylus of a phonograph pick-up device or by any other vibratile device. Alternatively, emitter 13 may be controlled by the solenoid 35 and collector 14 by the diaphragm 18.

There has thus been disclosed a second-order pressure-gradient microphone including a semiconductor device of the transistor type. The microphone of the invention will develop directly an output signal which is a derivative of the first order pressure gradient. Alternatively, an electromechanical transducer may be provided wherein the electrical output signal may be directly modified or modulated in accordance with a control signal.

What is claimed is:

1. An electromechanical transducer comprising a semi-conductor device including a semiconducting body, a base electrode in fixed low-resistance contact with said body, an emitter and a collector electrode in rectifying contact with said body, said emitter and collector electrodes consisting each of a conductor having a rounded tip in contact with said body, a vibratile device, means connecting said vibratile device to one of said conductors for tilting said one conductor, thereby to roll its tip over said body in response to movement of said device, and means connected to the other one of said conductors and adapted to tilt it, thereby to roll its tip over said body, whereby the distance between the contact points of said conductors with said body are jointly determined by vibrations of said vibratile device and by said second named means.

2. An electromechanical transducer comprising a semi-conductor device including a semiconducting body, a base electrode in fixed low-resistance contact with said body, an emitter and a collector electrode in rectifying contact with said body, said emitter and collector electrodes consisting each of a conductor having a rounded tip in contact with said body, a vibratile pressure responsive device, means to connect said device with one of said conductors to tilt said conductor about its tip in response to vibration of said device, a control device having a movable element, and means to connect said control device to the other one of said conductors to tilt said other conductor about its tip in response to movement of said element, whereby the distance between the contact points of said conductors with said body are jointly varied.

3. An electromechanical transducer comprising a semi-conductor device including a semiconducting body, a base electrode in fixed low-resistance contact with said body, an emitter and a collector electrode in rectifying contact with said body, said emitter and collector electrodes consisting each of a conductor having a rounded tip in contact with said body, a vibratile pressure-responsive device, a mechanical connection between said device and one of said conductors operative to roll the tip of said conductor in contact with said body in response to vibration of said device, a signal responsive device having a movable element, means to impress a signal on said signal responsive device, and a connection between said element and the other one of said conductors to roll the tip of said other conductor in contact with said body in response to said signal, whereby the distance between the contact points of said conductors with said body is determined jointly by vibration of said pressure-responsive device and by the signal impressed on said signal responsive device.

4. An electromechanical transducer comprising a semi-conductor device including a semiconducting body, a base electrode in fixed low-resistance contact with said body, an emitter and a collector electrode, each consisting of a conductor having a rounded tip in contact with said body, a first vibratile device connected with one of said conductors by means to tilt said conductor, thereby to roll its tip over said body, and a second vibratile device connected with the other one of said conductors by means to tilt said other conductor, thereby to roll its tip over said body, said devices being positioned to receive the same pressure wave with a different predetermined phase relationship, whereby the distance of the contact points of said conductors with said body is a function of the vibration of said devices.

5. An electromechanical transducer comprising a semi-conductor device including a semiconducting body, a base electrode in fixed low-resistance contact with said body, an emitter and a collector electrode, each consisting of a conductor having a rounded tip in contact with said body, a first vibratile pressure responsive device, means providing a mechanical connection between said first device and one of said conductors to roll its tip over said body in response to vibration of said first device, a second pressure responsive device, means providing a second mechanical connection between said second device and the other one of said conductors to roll its tip in contact with said body in response to vibrations of said second device, said devices being positioned to receive the same pressure wave with a different predetermined phase relationship, whereby the distance between the contact points of said conductors with said body is a function of the joint vibration of said devices.

6. A second order pressure gradient microphone comprising a semi-conductor device including a semi-conducting body, a base electrode in fixed low-resistance contact with said body, an emitter electrode and a collector electrode in rectifying contact with said body, each consisting of a conductor having a rounded tip in contact with said body, a pair of first order pressure gradient diaphragms disposed in predetermined spaced relationship, and means connecting each diaphragm with one of said conductors to impart movement of the diaphragms to the respective conductors, whereby the change in the distance between the contact points of said conductors at any instant is representative of the vector difference of the motion of said diaphragms.

7. A second order pressure gradient microphone comprising a semi-conductor device including a semi-conducting body having a substantially flat surface, a base electrode in fixed low-resistance contact with said body, an emitter electrode and a collector electrode in rectifying contact with the flat surface of said body, each rectifying electrode consisting of a metallic filamentary conductor having a rounded tip in contact with said body, a pair of first-order pressure-gradient diaphragms disposed in predetermined spaced relationship, a mechanical connection between each diaphragm and one of said conductors to impart movement of said diaphragms to the respective conductors, whereby the change in the distance between the contact points of said conductors at any instant is representative of the vector difference of the motion of said diaphragms.

8. A second order pressure gradient microphone comprising a semi-conductor device including a semi-conducting body, a base electrode in fixed low-resistance contact with said body, an emitter electrode and a collector electrode in rectifying contact with said body, each consisting of a conductor having a rounded tip in contact with said body, means for applying operating potentials to said electrodes, a load impedance element in circuit with said collector electrode for deriving an output signal, a pair of first order pressure gradient diaphragms disposed in predetermined spaced relationship, and means connecting each diaphragm with one of said conductors to impart movement of their associated diaphragms thereto, whereby said output signal is representative of the vector difference of the motion of said diaphragms.

9. A second order pressure gradient microphone comprising a semi-conductor device including a semi-conducting body, a base electrode in fixed low-resistance contact with said body, an emitter electrode and a collector electrode in rectifying contact with said body, each consisting of a metallic filamentary conductor having a rounded tip in contact with said body, means for applying operating potentials to said electrodes, a load impedance element in circuit with said collector electrode for deriving an output signal, a pair of first order pressure gradient diaphragms disposed in predetermined spaced relationship, and a mechanical connection between each diaphragm and one of said conductors to impart directly motion of said diaphragms to the respective conductors, whereby said output signal is representative of the vector difference of the motion of said diaphragms.

10. An electromechanical transducer comprising a semi-conductor device including a semi-conducting body, a base electrode in fixed low-resistance contact with said body, an emitter and a collector electrode, each consisting of a conductor having a rounded tip in contact with said body, a first vibratile device connected with one of said conductors and adapted to roll its tip in contact with said body in response to the motion of said first device, a second vibratile device connected to the other one of said conductors and adapted to roll its tip in contact with said body in response to the motion of said second device, said devices being positioned to receive the same pressure wave with a different predetermined phase relationship, means for applying operating potentials to said electrodes, and a load impedance element in circuit with said collector electrode for deriving an output signal representative of the vector difference of the motion of said devices.

ROBERT K. DUNCAN.

References Cited in the file of this patent

UNITED STATES PATENTS

| Number | Name | Date |
|---|---|---|
| 2,486,560 | Gray | Nov. 1, 1949 |
| 2,487,962 | Arndt, Jr. | Nov. 15, 1949 |
| 2,497,770 | Hanson | Feb. 14, 1950 |
| 2,522,521 | Kock | Sept. 19, 1950 |
| 2,549,550 | Wallace, Jr. | Apr. 17, 1951 |